United States Patent
Beon et al.

(10) Patent No.: US 12,461,294 B2
(45) Date of Patent: Nov. 4, 2025

(54) POLARIZING FILM AND DISPLAY APPARATUS EMPLOYING THE SAME

(71) Applicant: SAMSUNG DISPLAY CO., LTD., Yongin-si (KR)

(72) Inventors: Beonghun Beon, Yongin-si (KR); Dukjin Lee, Yongin-si (KR); Woosuk Jung, Yongin-si (KR); Hyosung Hong, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 382 days.

(21) Appl. No.: 18/154,378

(22) Filed: Jan. 13, 2023

(65) Prior Publication Data
US 2024/0004115 A1 Jan. 4, 2024

(30) Foreign Application Priority Data
May 27, 2022 (KR) .................. 10-2022-0065288

(51) Int. Cl.
*G02B 5/30* (2006.01)
(52) U.S. Cl.
CPC .......... *G02B 5/3016* (2013.01); *G02B 5/305* (2013.01); *G02B 5/3083* (2013.01)
(58) Field of Classification Search
CPC .... G02B 5/3016; G02B 5/305; G02B 5/3083; G02B 1/04; G02F 1/133528; G02F 1/133531; G09F 9/30; H10K 59/50; H10K 59/8793; H10K 50/00; H10K 59/00; H05B 33/02
See application file for complete search history.

(56) References Cited

U.S. PATENT DOCUMENTS

| | | |
|---|---|---|
| 6,999,071 B2 | 2/2006 | Balogh |
| 7,553,046 B2 | 6/2009 | Noh et al. |
| 7,661,862 B2 | 2/2010 | Lee et al. |
| 7,859,274 B2 | 12/2010 | Kim et al. |
| 8,004,765 B2 | 8/2011 | Amitai |
| 9,158,143 B2 | 10/2015 | Chen et al. |
| 9,347,649 B2 | 5/2016 | Eakin |
| 9,383,589 B2 | 7/2016 | Cho et al. |
| 9,581,858 B2 | 2/2017 | Cho et al. |
| 9,714,384 B2 | 7/2017 | Beltran Gracia et al. |
| 10,048,420 B2 | 8/2018 | Adlem et al. |
| 10,615,376 B2 | 4/2020 | Giraldo et al. |
| 10,649,210 B2 | 5/2020 | Cobb et al. |

(Continued)

FOREIGN PATENT DOCUMENTS

| | | |
|---|---|---|
| JP | 2004309904 A | 11/2004 |
| JP | 2015161714 A | 9/2015 |

(Continued)

*Primary Examiner* — Mariam Qureshi
(74) *Attorney, Agent, or Firm* — CANTOR COLBURN LLP

(57) ABSTRACT

A polarizing film includes a polarizing layer and a twisted liquid crystal layer. The twisted liquid crystal layer includes liquid crystal molecules arranged to have different degrees of inclination from each other with respect to a transmission axis of the polarizing layer in a thickness direction. A top tilting angle is about 64° to about 75°; a bottom tilting angle is about 135° to about 145°, and the twisted liquid crystal layer has a thickness of about 2.5 μm to about 3 μm in the thickness direction.

20 Claims, 15 Drawing Sheets

(56) References Cited

U.S. PATENT DOCUMENTS

| | | |
|---|---|---|
| 10,745,620 B2 | 8/2020 | Smith et al. |
| 11,009,711 B2 | 5/2021 | Jiang |
| 11,143,503 B2 | 10/2021 | Kim et al. |
| 11,221,438 B2 | 1/2022 | Lee et al. |
| 11,283,157 B2 | 3/2022 | Baik et al. |
| 2004/0257498 A1 | 12/2004 | Uesaka et al. |
| 2005/0035361 A1 | 2/2005 | Peterson et al. |
| 2005/0253112 A1 | 11/2005 | Kelly et al. |
| 2006/0103782 A1 | 5/2006 | Adachi et al. |
| 2009/0015142 A1 | 1/2009 | Potts et al. |
| 2010/0061598 A1 | 3/2010 | Seo |
| 2013/0229605 A1* | 9/2013 | Do .................. G02B 5/3016 349/194 |
| 2017/0052298 A1 | 2/2017 | Amin et al. |
| 2017/0212288 A1* | 7/2017 | Ohyama ............ H10K 59/8791 |
| 2018/0148648 A1 | 5/2018 | Smith et al. |
| 2020/0142254 A1 | 5/2020 | Ryu et al. |
| 2020/0364940 A1 | 11/2020 | Coup et al. |
| 2021/0325590 A1 | 10/2021 | Lee et al. |
| 2021/0336230 A1 | 10/2021 | Lee et al. |
| 2022/0035086 A1 | 2/2022 | Delbaere et al. |

FOREIGN PATENT DOCUMENTS

| | | | |
|---|---|---|---|
| KR | 1020050120573 A | 12/2005 | |
| KR | 1020070004512 A | 1/2007 | |
| KR | 100708147 B1 | 4/2007 | |
| KR | 100754327 B1 | 8/2007 | |
| KR | 100783309 B1 | 12/2007 | |
| KR | 100864139 B1 | 10/2008 | |
| KR | 1020100033371 A | 3/2010 | |
| KR | 1020100047855 A | 5/2010 | |
| KR | 100977232 B1 | 8/2010 | |
| KR | 1020150092424 A | 8/2015 | |
| KR | 101557598 B1 | 9/2015 | |
| KR | 101489409 B1 | 1/2016 | |
| KR | 20160076701 A | 7/2016 | |
| KR | 1020150120487 A | 10/2016 | |
| KR | 1020160137315 A | 11/2016 | |
| KR | 1020160120744 A | 2/2017 | |
| KR | 1020170041792 A | 4/2017 | |
| KR | 101754787 B1 | 6/2017 | |
| KR | 20170129773 A | 11/2017 | |
| KR | 20170133740 A | 12/2017 | |
| KR | 1020180011173 A | 1/2018 | |
| KR | 1020180104056 A | 9/2018 | |
| KR | 1020180125377 A | 11/2018 | |
| KR | 1020190005906 A | 1/2019 | |
| KR | 1020190032404 A | 3/2019 | |
| KR | 1020190067873 A | 6/2019 | |
| KR | 20200002616 A | 1/2020 | |
| KR | 1020200016794 A | 2/2020 | |
| KR | 102093832 B1 | 3/2020 | |
| KR | 1020200050903 A | 5/2020 | |
| KR | 1020200050902 A | 6/2020 | |
| KR | 102162146 B1 | 9/2020 | |
| KR | 1020200102579 A | 9/2020 | |
| KR | 20200126492 A | 11/2020 | |
| KR | 102205991 B1 | 1/2021 | |
| KR | 102271203 B1 | 6/2021 | |
| KR | 102277671 B1 | 7/2021 | |
| KR | 20210120920 A | 10/2021 | |

* cited by examiner

FIG. 10

|      | θ40° AACD |
|------|-----------|
| # 2  | 50.45     |
| # 9  | 19.29     |
| # 10 | 12.86     |
| # 11 | 14.23     |
| # 12 | 7.83      |
| # 13 | 10.46     |
| # 14 | 6.09      |
| # 15 | 11.22     |
| # 8  | 17.08     |

POLARIZING FILM AND DISPLAY APPARATUS EMPLOYING THE SAME

This application claims priority to Korean Patent Application No. 10-2022-0065288, filed on May 27, 2022, and all the benefits accruing therefrom under 35 U.S.C. § 119, the content of which in its entirety is herein incorporated by reference.

BACKGROUND

1. Field

One or more embodiments relate to a polarizing film and a display apparatus employing the same, and more particularly, to a polarizing film having a twisted liquid crystal layer and a display apparatus employing the same.

2. Description of the Related Art

A display apparatus is configured to implement images. Examples of the display apparatus may include a liquid crystal display ("LCD"), an organic light-emitting diode ("OLED") display, and an electrophoretic display ("EPD"). In such a display apparatus, a polarizing film is introduced to prevent external light from being reflected from the front surface of the display apparatus.

SUMMARY

One or more embodiments include a polarizing film having excellent anti-reflection characteristics and reflection chroma characteristics, and a display apparatus employing the same. However, this is merely an example, and the scope of the disclosure is not limited thereby.

Additional aspects will be set forth in part in the description which follows and, in part, will be apparent from the description, or may be learned by practice of the presented embodiments of the disclosure.

According to one or more embodiments, a polarizing film includes: a polarizing layer, and a twisted liquid crystal layer arranged on one side of the polarizing layer, the twisted liquid crystal layer including liquid crystal molecules arranged to have different degrees of inclination from each other with respect to a transmission axis of the polarizing layer in a thickness direction; where a top tilting angle is about 64 degrees (°) to about 75°, the top tilting angle is an angle at which the liquid crystal molecules arranged in an uppermost portion of the twisted liquid crystal layer are inclined with respect to the transmission axis of the polarizing layer, a bottom tilting angle is about 135° to about 145°, the bottom tilting angle is an angle at which liquid crystal molecules arranged in a lowermost portion of the twisted liquid crystal layer are inclined with respect to the transmission axis of the polarizing layer, and the twisted liquid crystal layer has a thickness of about 2.5 micrometers (µm) to about 3 µm in the thickness direction.

In an embodiment, an angle between the top tilting angle and the bottom tilting angle may be about 25° to about 75°.

In an embodiment, the twisted liquid crystal layer may have a negative dispersion characteristic.

In an embodiment, the liquid crystal molecules included in the twisted liquid crystal layer may have a positive dispersion characteristic.

In an embodiment, the liquid crystal molecules included in the twisted liquid crystal layer may have a rod shape.

In an embodiment, the polarizing film may further include a first protective layer between the polarizing layer and the twisted liquid crystal layer, and a second protective layer on the polarizing layer, wherein the first protective layer and the second protective layer may include at least one selected from triacetyl cellulose ("TAC"), cyclo olefin polymer, polymethyl methacrylate ("PMMA"), and polyethylene terephthalate ("PET").

In an embodiment, the polarizing film may further include a retardation compensation layer under the twisted liquid crystal layer.

In an embodiment, the polarizing film may further include an adhesive layer under the retardation compensation layer.

In an embodiment, an effective retardation value of the twisted liquid crystal layer may be about 124 nanometers (nm) to about 143 nm.

In an embodiment, an azimuthal angle color distribution ("AACD") value when a polar angle of the polarizing film is 40° may be 20 or less, where AACD={Max(a*)−Min(a*)}×{Max(b*)−Min(b*)}, a* and b* are coordinate values in an International Commission on Illumination ("CIE") L*a*b* coordinate system, Max(a*) and Min(a*) are a maximum value and a minimum value of a* coordinate values measured for an azimuthal angle φ=0° to 360°, respectively, and Max(b*) and Min(b*) are a maximum value and a minimum value of b* coordinate values measured for an azimuthal angle φ=0° to 360°, respectively.

According to one or more embodiments, a display apparatus includes a substrate, a plurality of display elements on the substrate, an encapsulation member encapsulating the plurality of display elements, and a polarizing film on the encapsulation member. The polarizing film includes a polarizing layer and a twisted liquid crystal layer arranged on one side of the polarizing layer, the twisted liquid crystal layer including liquid crystal molecules arranged to have different degrees of inclination from each other with respect to a transmission axis of the polarizing layer in a thickness direction. A top tilting angle is about 64° to about 75°, the top tilting angle is an angle at which liquid crystal molecules arranged in an uppermost portion of the twisted liquid crystal layer are inclined with respect to the transmission axis of the polarizing layer, a bottom tilting angle is about 135° to about 145°, the bottom tilting angle is an angle at which liquid crystal molecules arranged in a lowermost portion of the twisted liquid crystal layer are inclined with respect to the transmission axis of the polarizing layer, and the twisted liquid crystal layer has a thickness of about 2.5 µm to about 3 µm in the thickness direction.

In an embodiment, an angle between the top tilting angle and the bottom tilting angle may be about 25° to about 75°.

In an embodiment, the twisted liquid crystal layer may have a negative dispersion characteristic.

In an embodiment, the liquid crystal molecules included in the twisted liquid crystal layer may have a positive dispersion characteristic.

In an embodiment, the liquid crystal molecules included in the twisted liquid crystal layer may have a rod shape.

In an embodiment, the display apparatus may further include a first protective layer between the polarizing layer and the twisted liquid crystal layer, and a second protective layer on the polarizing layer, wherein the first protective layer and the second protective layer may include at least one selected from triacetyl cellulose (TAC), cyclo olefin polymer, polymethyl methacrylate (PMMA), and polyethylene terephthalate (PET).

In an embodiment, the display apparatus may further include a retardation compensation layer under the twisted liquid crystal layer.

In an embodiment, the display apparatus may further include an adhesive layer under the retardation compensation layer.

In an embodiment, an effective retardation value of the twisted liquid crystal layer may be about 124 nm to about 143 nm.

In an embodiment, an azimuthal angle color distribution (AACD) value when a polar angle of the polarizing film may be 40° is 20 or less, where AACD={Max(a*)−Min(a*)}×{Max(b*)−Min(b*)}, a* and b* are coordinate values in a CIE L*a*b* coordinate system, Max(a*) and Min(a*) are a maximum value and a minimum value of a* coordinate values measured for an azimuthal angle φ=0° to 360°, respectively, and Max(b*) and Min(b*) are a maximum value and a minimum value of b* coordinate values measured for an azimuth angle φ=0° to 360°, respectively.

BRIEF DESCRIPTION OF THE DRAWINGS

The above and other aspects, features, and advantages of certain embodiments of the disclosure will be more apparent from the following description taken in conjunction with the accompanying drawings, in which.

Figure 5:
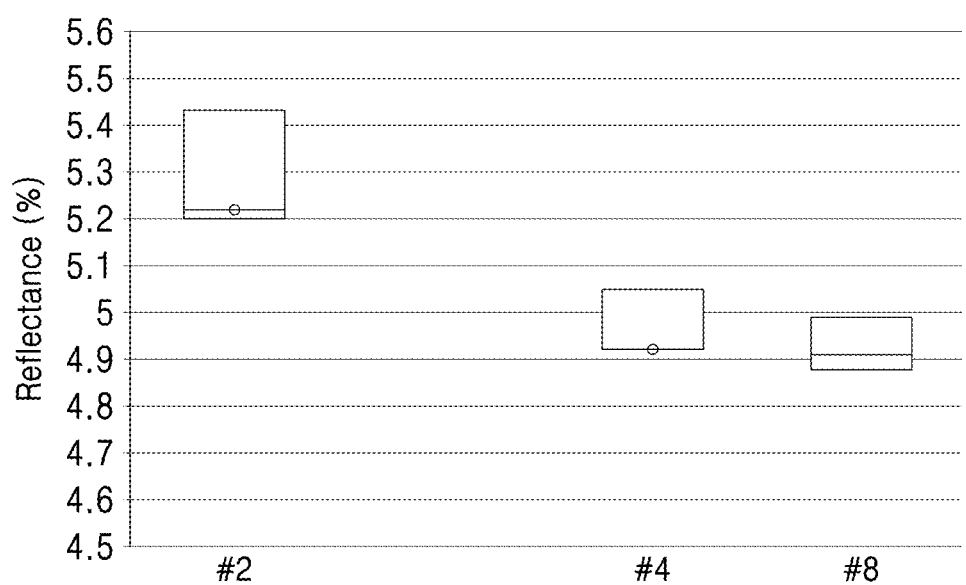
FIG. 5 illustrates front reflectance for some samples of Table 1.
Figure 6:
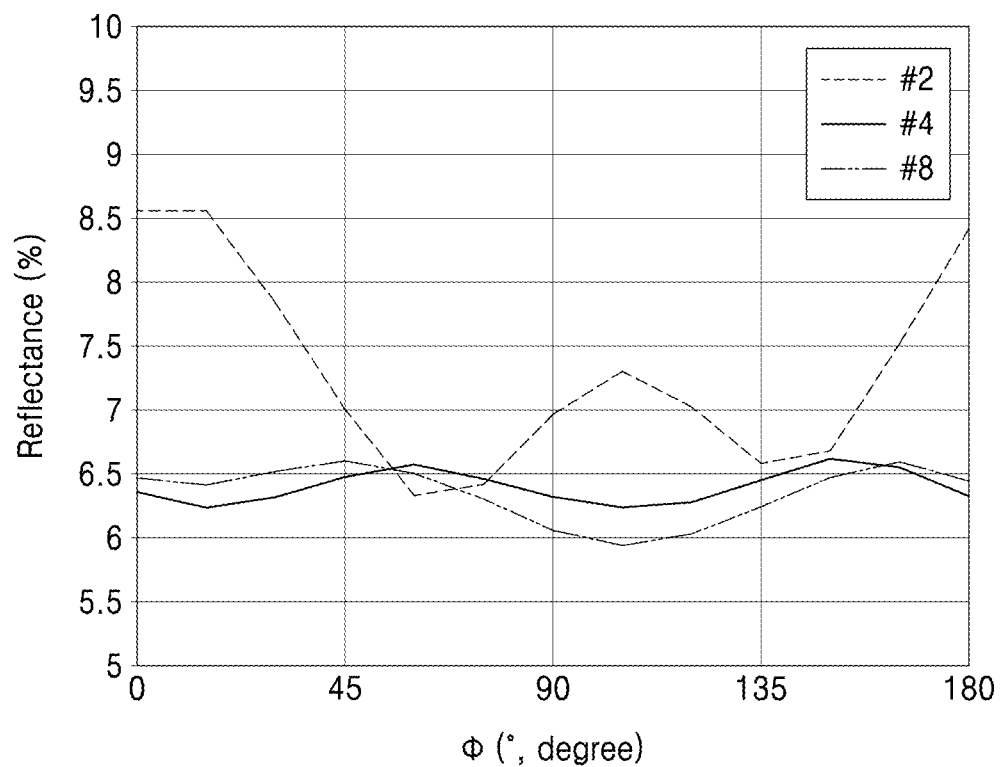
FIG. 6 illustrates side reflectance in a lateral direction of 40° with respect to a front side.
Figure 7:
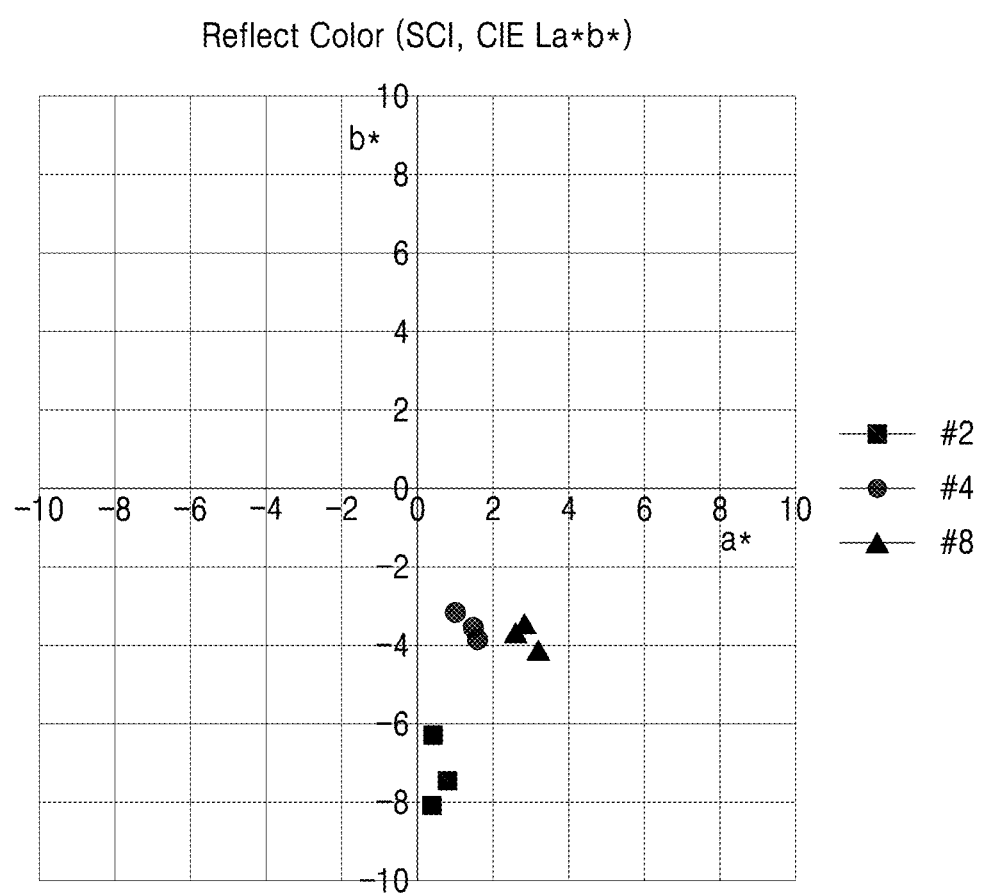
Figure 8:
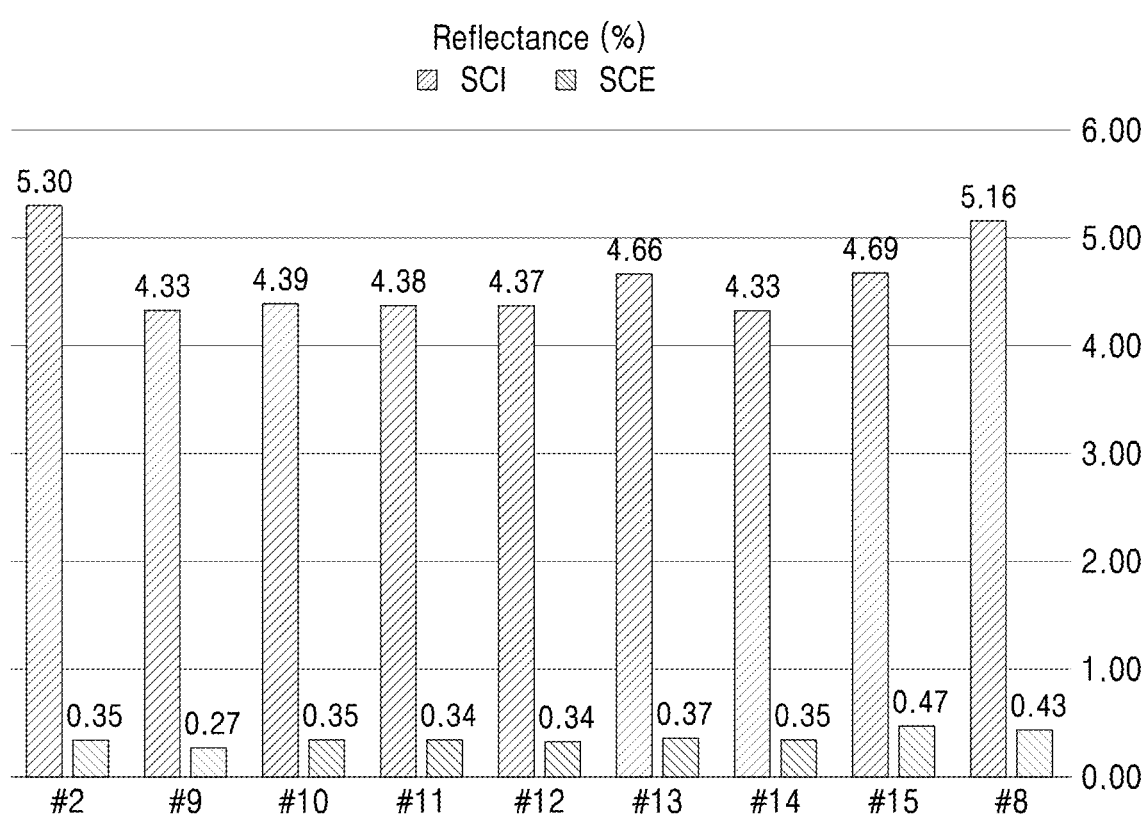
Figure 9A:
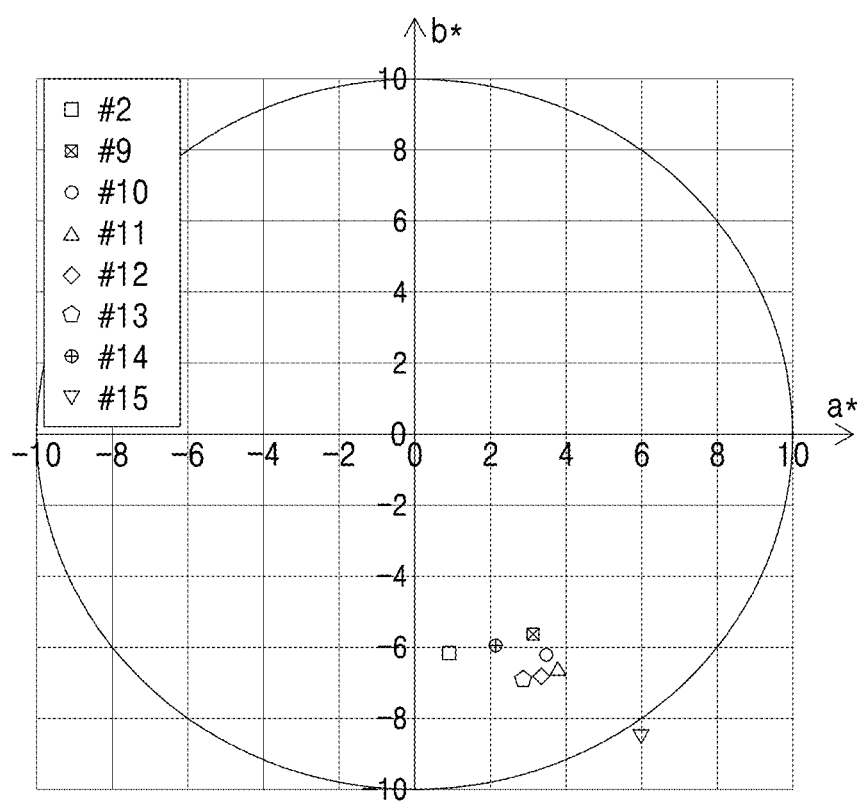
Figure 9B:
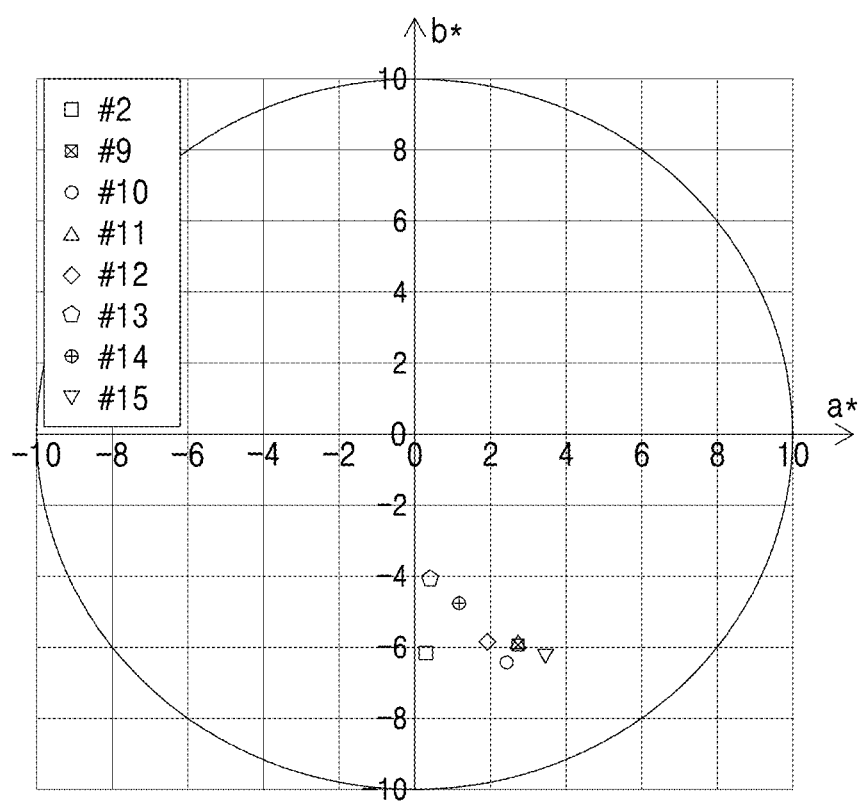
Figure 9C:
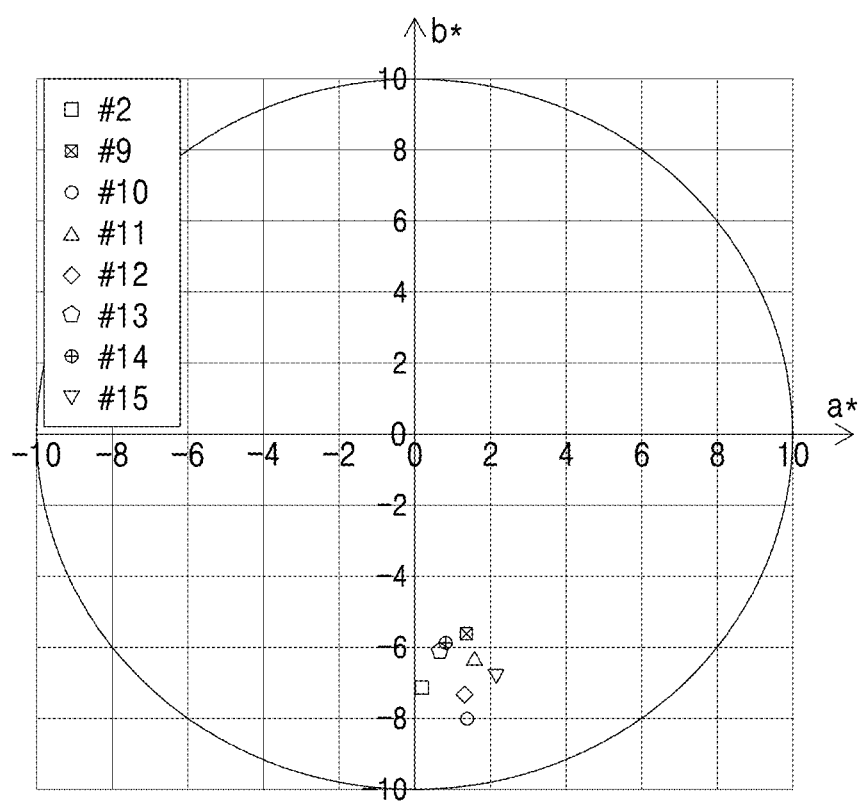
Figure 11:
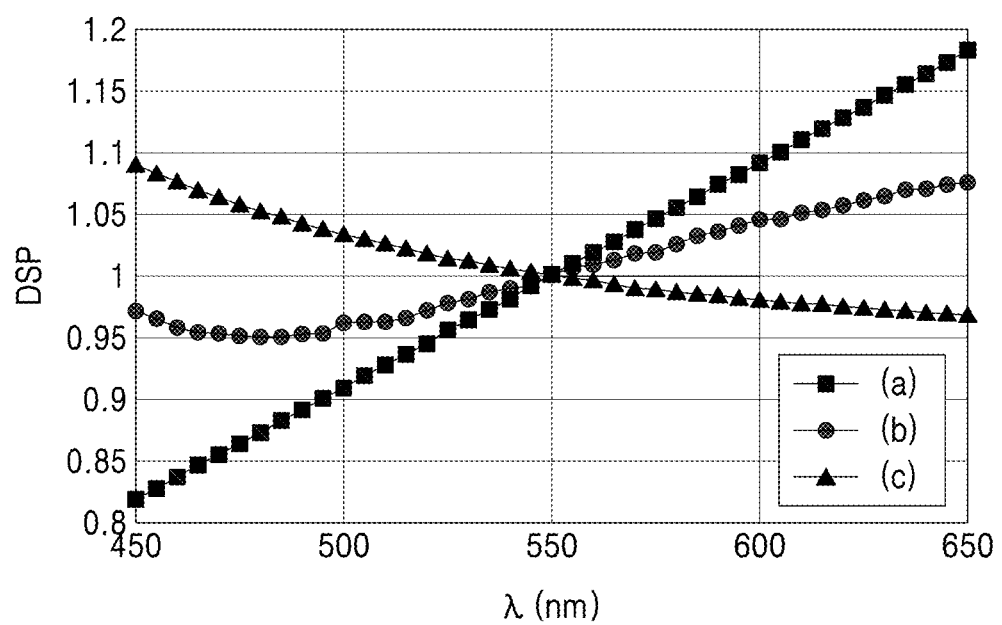
Figure 12:
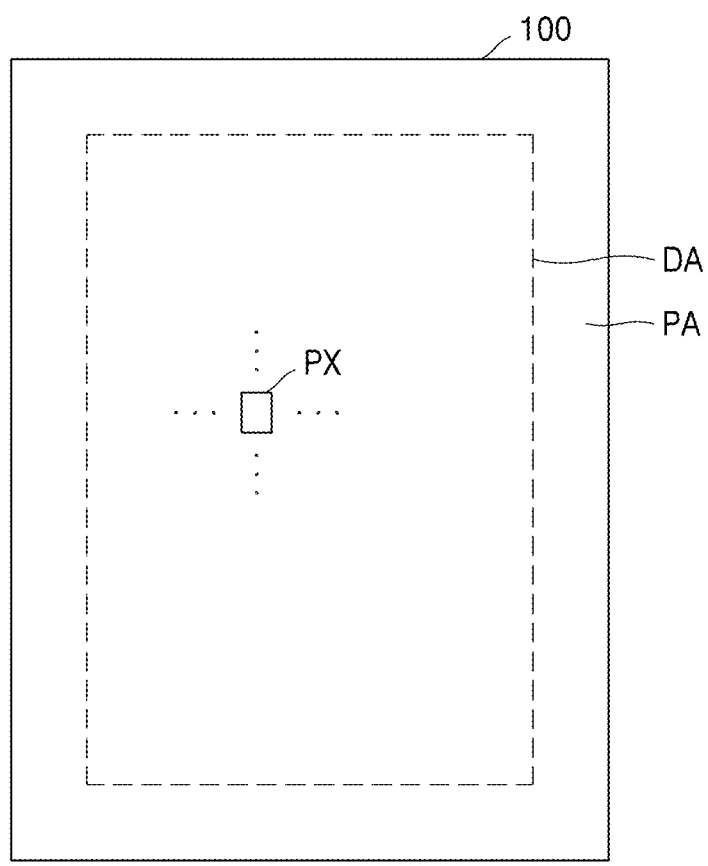
Figure 13:
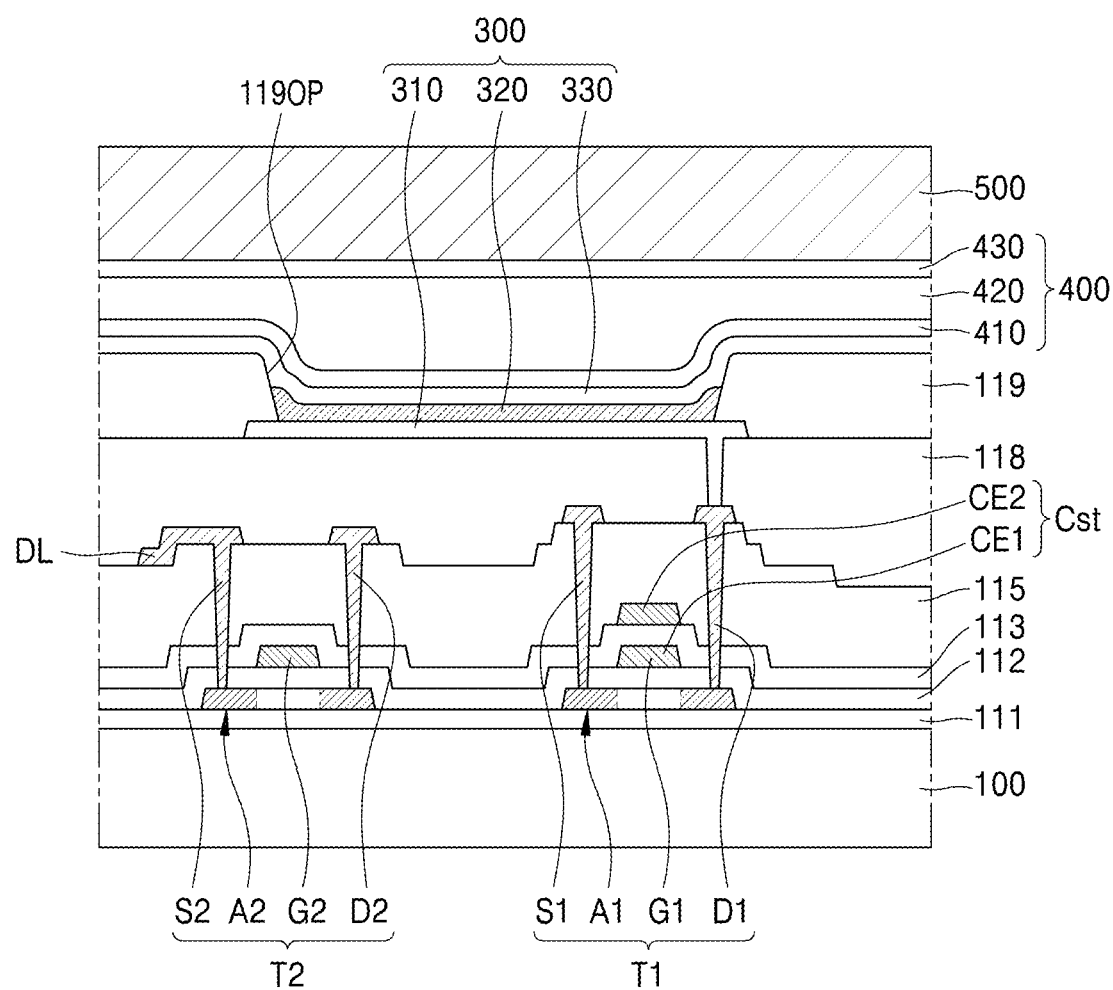

The reflectance in FIGS. 5 and 6 represents a Specular Component Included (SCI) reflectance;

FIG. 7 illustrates reflection chroma for some samples of Table 1 in International Commission on Illumination (CIE) L*a*b* coordinates;

FIG. 8 illustrates SCI reflectance and Specular Component Excluded ("SCE") reflectance for some samples of Table 1;

FIGS. 9A to 9C illustrate reflection chroma for some samples of Table 1 according to azimuthal angles in CIE L*a*b* coordinates;

FIG. 10 shows data obtained by measuring lateral characteristics of some samples of Table 1;

FIG. 11 is a graph showing wavelength dispersion characteristics of sample #12 in Table 1;

FIG. 12 is a plan view schematically illustrating a display apparatus according to an embodiment; and FIG. 13 is a cross-sectional view schematically illustrating a portion of a display apparatus, according to an embodiment.

DETAILED DESCRIPTION

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Throughout the disclosure, the expression "at least one of a, b or c" indicates only a, only b, only c, both a and b, both a and c, both b and c, all of a, b, and c, or variations thereof.

As the present description allows for various changes and numerous embodiments, certain embodiments will be illustrated in the drawings and described in detail in the written description. Effects and features of the disclosure, and methods of achieving them will be clarified with reference to embodiments described below in detail with reference to the drawings. However, the disclosure is not limited to the following embodiments and may be embodied in various forms.

Hereinafter, embodiments will be described in detail with reference to the accompanying drawings. When describing embodiments with reference to the accompanying drawings, the same or corresponding elements are denoted by the same reference numerals.

It will be understood that although the terms "first," "second" etc. may be used herein to describe various elements, these elements should not be limited by these terms. These terms are only used to distinguish one element from another.

The singular forms "a," "an," and "the" as used herein are intended to include the plural forms as well unless the context clearly indicates otherwise.

It will be further understood that the terms "include" and/or "comprise" used herein specify the presence of stated features or elements, but do not preclude the presence or addition of one or more other features or elements.

It will be further understood that, when a layer, region, or element is referred to as being "on" another layer, region, or element, it may be directly or indirectly on the other layer, region, or element. That is, for example, intervening layers, regions, or elements may be present.

Also, sizes of elements in the drawings may be exaggerated or reduced for convenience of explanation. For example, because sizes and thicknesses of elements in the drawings are arbitrarily illustrated for convenience of explanation, the disclosure is not limited thereto.

When a certain embodiment may be implemented differently, a specific process order may be performed differently from the described order. For example, two consecutively described processes may be performed substantially at the same time or performed in an order opposite to the described order.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

It will be further understood that, when layers, regions, or elements are referred to as being connected to each other, they may be directly connected to each other or indirectly connected to each other with intervening layers, regions, or elements therebetween. For example, when layers, regions, or elements are referred to as being electrically connected to each other, they may be directly electrically connected to each other or indirectly electrically connected to each other with intervening layers, regions, or elements therebetween.

Figure 1:
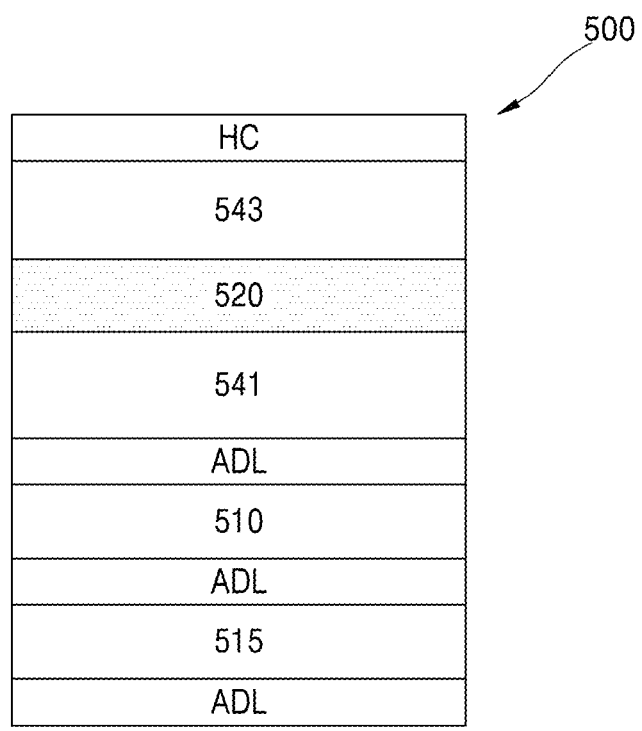
FIG. 1 is a schematic cross-sectional view of a polarizing film according to an embodiment.

FIG. 1 is of the schematic cross-sectional view of a polarizing film 500 according to an embodiment.

Referring to FIG. 1, the polarizing film 500 according to an embodiment includes a polarizing layer 520 and a twisted liquid crystal layer 510. The polarizing film 500 may further include a first protective layer 541, a second protective layer 543, an adhesive layer ADL, a hard coating layer HC, and/or a retardation compensation layer 515.

The polarizing layer 520 may be configured to polarize light incident from a light source (not illustrated) into light of the same direction as a polarization axis. In some embodiments, the polarizing layer 520 may include a polarizer and/or a dichroic dye in a polyvinyl alcohol ("PVA") film. The dichroic dye may be iodine molecules and/or dye molecules.

In some embodiments, the polarizing layer 520 may be formed by stretching a PVA film in one direction and immersing the PVA film in a solution of iodine and/or dichroic dye. In this case, iodine molecules and/or dichroic dye molecules are arranged in a line in a stretching direction. Because the iodine molecules and the dichroic dye molecules exhibit dichroism, the iodine molecules and the dichroic dye molecules may absorb light vibrating in the stretching direction and transmit light vibrating in a direction perpendicular to the stretching direction.

The twisted liquid crystal layer 510 is arranged at one side of the polarizing layer 520. The twisted liquid crystal layer 510 may be configured to retard the phase of light polarized through the polarizing layer 520. Light passing through the twisted liquid crystal layer 510 may be converted into circularly polarized light or elliptically polarized light. Accordingly, the reflectance of light may be lowered. The twisted liquid crystal layer 510 may be arranged farther away from the light source than the polarizing layer 520. For example, when external light is incident from above the polarizing layer 520, the twisted liquid crystal layer 510 may be disposed under the polarizing layer 520.

As the wavelength of light incident onto the twisted liquid crystal layer 510 increases, the birefringence ($\Delta n = n_e - n_o$, where $n_e$ is an extraordinary refractive index and $n_o$ is an ordinary refractive index) of the twisted liquid crystal layer 510 may increase. That is, the twisted liquid crystal layer 510 may have a negative dispersion characteristic.

On the other hand, liquid crystal molecules LC themselves included in the twisted liquid crystal layer 510 may have a characteristic in which the birefringence value of the liquid crystal molecules LC decreases as the wavelength of incident light increases. That is, the liquid crystal molecules LC may have a positive dispersion characteristic.

In general, most of media having optical anisotropy existing in a natural state have a positive dispersion characteristic in which the birefringence value decreases as the wavelength of incident light increases. When the media have a positive dispersion characteristic, a bandwidth for a retardation may be narrowed. In addition, in the case of a retardation film designed for a specific wavelength, a retardation effect may be limited because a phase difference is different in other wavelength ranges. Therefore, in order to maximize the performance of the retardation film, it may be advantageous to have the negative dispersion characteristic in which the birefringence value increases as the wavelength of incident light increases.

Accordingly, A case that different types of liquid crystal materials are synthesized through a covalent bond so that liquid crystal molecules themselves have a negative dispersion characteristic may be considered. However, the liquid crystal materials synthesized as described above may have poor reliability at high temperatures.

In the present embodiment, the twisted liquid crystal layer 510 having a negative dispersion characteristic is formed by using a natural liquid crystal material having a positive dispersion characteristic, and thus, the polarizing film 500 having excellent anti-reflection properties and reliability may be provided.

On the other hand, the first protective layer 541 and the second protective layer 543 may be disposed on the lower surface and the upper surface of the polarizing layer 520, respectively. The first protective layer 541 and the second protective layer 543 may support the polarizing layer 520 and thus act as a protective layer that compensates for the mechanical strength of the polarizing layer 520. The first protective layer 541 and the second protective layer 543 may include triacetyl cellulose (TAC), cyclo olefin polymer, polymethyl methacrylate (PMMA), polyethylene terephthalate (PET), or the like.

The retardation compensation layer 515 may be configured to compensate for a retardation with respect to a side viewing angle. The retardation compensation layer 515 may be configured to partially compensate for a retardation caused by the twisted liquid crystal layer 510. The retardation compensation layer 515 may include polycarbonate ("PC"), TAC, or cyclo olefin polymer. In some embodiments, the retardation compensation layer 515 may be omitted.

The adhesive layer ADL may be disposed between the first protective layer 541 and the twisted liquid crystal layer 510, may be disposed between the twisted liquid crystal layer 510 and the retardation compensation layer 515, and/or may be disposed on the lower surface of the retardation compensation layer 515. The adhesive layer ADL may be configured to bond components included in the polarizing film 500 to each other. The adhesive layer ADL, which is disposed on the lower surface of the retardation compensation layer 515, may be configured to bond the polarizing film 500 to a display apparatus or the like. The adhesive layer ADL may be a pressure sensitive adhesive ("PSA").

The hard coating layer HC may be configured to protect components of the polarizing film 500 from external impact, and may be disposed in the uppermost portion of the polarizing film 500. The hard coating layer HC may have a scratch-resistant function and may have a strength/hardness of about 9H.

Figure 2:
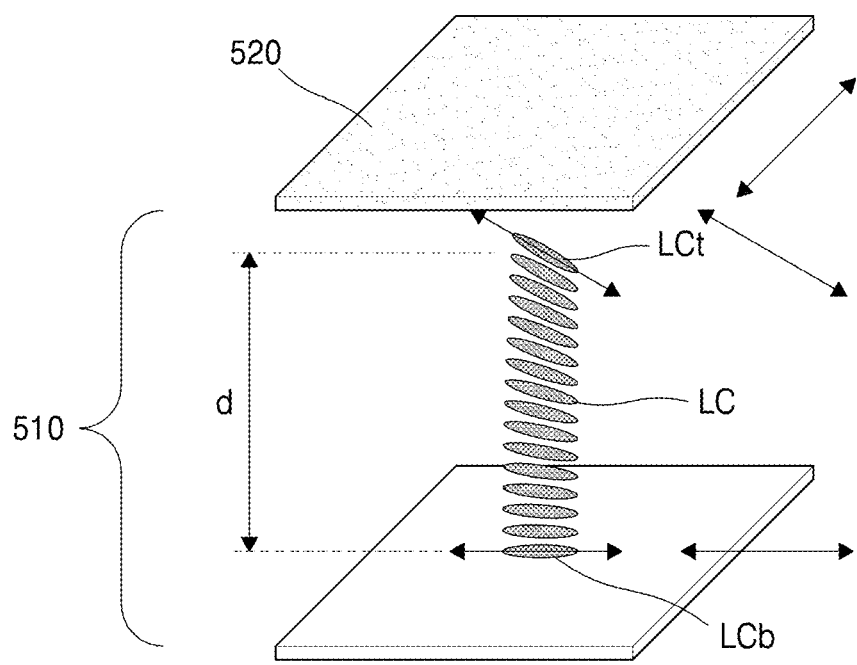
FIG. 2 is a diagram for describing a twisted liquid crystal layer included in a polarizing film, according to an embodiment.
Figure 3:
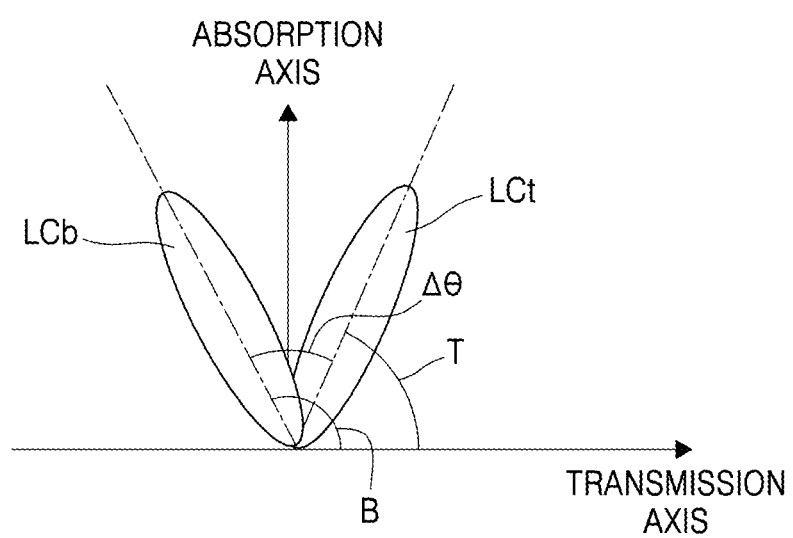
FIG. 3 is a diagram illustrating a degree of inclination of liquid crystal molecules with respect to a transmission axis of a polarizing layer.
Figure 4:
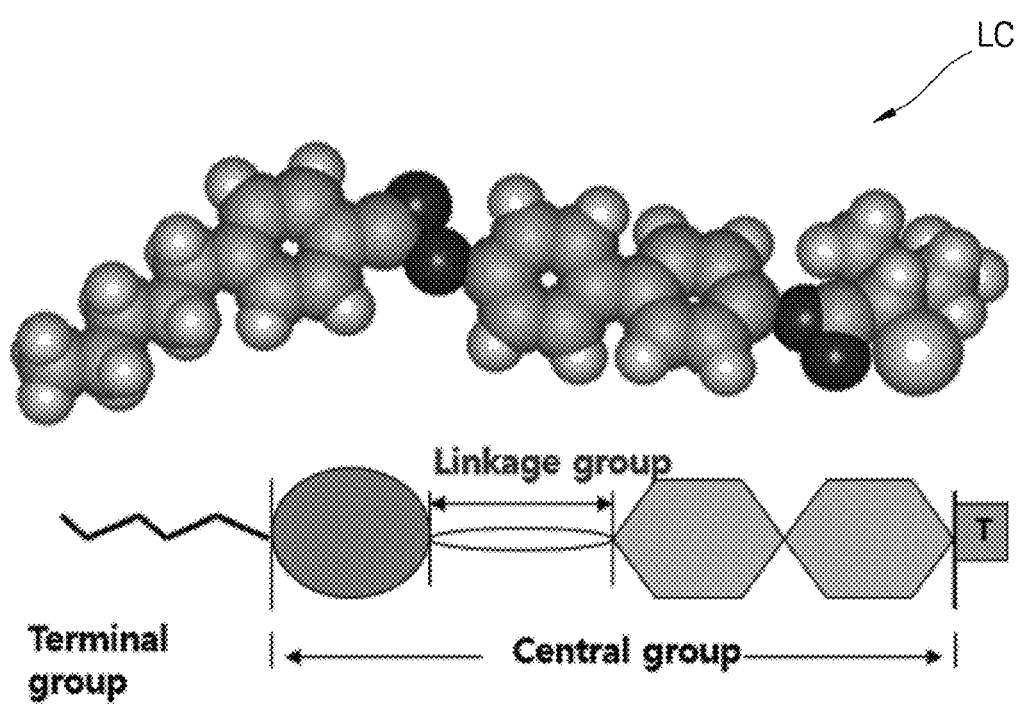
FIG. 4 is a diagram illustrating an example of liquid crystal molecules that are usable in a twisted liquid crystal layer.

FIG. 2 is a diagram for describing the twisted liquid crystal layer 510 included in the polarizing film 500, according to an embodiment, FIG. 3 is a diagram illustrating a degree of inclination of liquid crystal molecules with respect to a transmission axis of the polarizing layer 520, and FIG. 4 is a diagram illustrating an example of liquid crystal molecules that are usable in the twisted liquid crystal layer 510.

Referring to FIGS. 2 and 3, the twisted liquid crystal layer 510 according to the present embodiment has a certain thickness d, and the liquid crystal molecules LC included in the twisted liquid crystal layer 510 have different degrees of inclination from each other with respect to the transmission axis of the polarizing layer 520 according to a distance of the liquid crystal molecules LC from the polarizing layer 520 in a thickness direction. As used herein, the "thickness direction" is a direction measuring the thickness d of the twisted liquid crystal layer 510.

Retardation characteristics of the twisted liquid crystal layer 510 may be changed according to an inclined angle at each position of the liquid crystal molecules LC included in the twisted liquid crystal layer 510, the thickness of the twisted liquid crystal layer 510, and refractive index characteristics of the twisted liquid crystal layer 510.

In addition, retardation characteristics of the twisted liquid crystal layer 510 may be changed according to a range of a top tilting angle T, which is an angle at which liquid crystal molecules LCt disposed in the uppermost portion of the twisted liquid crystal layer 510 are inclined with respect to the transmission axis, a range of a bottom tilting angle B, which is an angle at which liquid crystal molecules LCb disposed in the lowermost portion of the twisted liquid crystal layer 510 are inclined with respect to the transmission axis, and a range of an angle Δθ that is difference between the top tilting angle T and the bottom tilting angle B.

On the other hand, an effective retardation value (Ref) of the twisted liquid crystal layer 510 may be calculated by the following equation.

$$R_{\textit{eff}} = (n_e - n_o) \times d \times \int_B^T \sin^2(2\theta) d\theta$$

where $n_e$ is the extraordinary refractive index of the liquid crystal molecules, $n_o$ is the ordinary refractive index of the liquid crystal molecules, d is the thickness of the twisted liquid crystal layer, T is the top tilting angle, B is the bottom tilting angle, and θ is the tilting angle according to position.

In the present embodiment, the effective retardation value ($R_{\textit{eff}}$) may be included in a range of about 100 nanometers (nm) to about 165 nm, and preferably about 124 nm to about 143 nm, with respect to a wavelength of 550 nm.

The polarizing film 500 according to the embodiment minimizes the front reflectance and also presents a condition value within a range that satisfies the side reflectance and neutral black. The effective retardation value ($R_{\textit{eff}}$) of the twisted liquid crystal layer 510 according to the embodiment is in a range around λ/4, but may not coincide with λ/4. In addition, even when the effective phase delay value ($R_{\textit{eff}}$) is in a range of about 100 nm to about 165 nm, characteristics of the twisted liquid crystal layer 510 may be changed according to the range of the top tilting angle T, the range of the bottom tilting angle B, and the range of the angle Δθ that is difference between the top tilting angle T and the bottom tilting angle B. One or more embodiments provide the polarizing film 500 including the twisted liquid crystal layer 510, which may minimize the front reflectance and the side reflectance and may implement even neutral black.

In the present embodiment, the top tilting angle T may be about 64 degrees (°) to about 75°, where the top tilting angle T is an angle at which the liquid crystal molecules disposed in the uppermost portion of the twisted liquid crystal layer 510 are inclined with respect to the transmission axis, and the bottom tilting angle B may be about 135° to about 145°, where the bottom tilting angle is an angle at which the liquid crystal molecules disposed in the lowermost portion of the twisted liquid crystal layer 510 are inclined with respect to the transmission axis. The angle Δθ that is difference between the top tilting angle T and the bottom tilting angle B may be about 25° to about 75°. In addition, in the present embodiment, the thickness d of the twisted liquid crystal layer 510 may be about 2.5 micrometers (μm) to about 3 μm.

Referring to FIG. 4, the liquid crystal molecule included in the twisted liquid crystal layer according to the embodiment may have a rod shape. The liquid crystal molecule may include a terminal group, a linkage group, a central group, and a polar group (T-group).

The terminal group and the linkage group may exhibit length and/or viscosity characteristics of the liquid crystal molecule. The terminal group may include at least one of an alkyl group, an alkoxy group, an alkenyl group, and an alkenyloxy group. The linkage group may include at least one of tolane, ester (COO), ethylene ($CH_2CH_2$), $OCH_2$, and $(CH_2)_n$.

The central group may exhibit absolute refractive index and refractive index anisotropy characteristics of the liquid crystal molecule. The central group may include at least one of aromatic rings represented by Formula 1 below. A short wavelength refractive index of the liquid crystal molecule may be controlled according to the content of the central group.

[Formula 1]

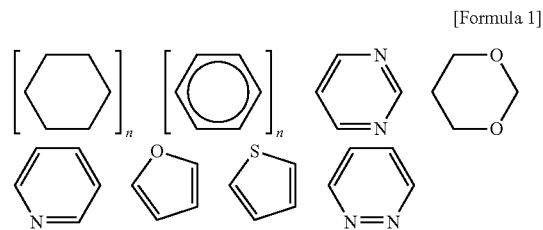

The polar group (T-group) may include an alkyl group, an alkoxy group, CN, a halogen atom, or the like. A polarity affecting a liquid crystal phase may be changed according to the polar group.

On the other hand, the wavelength dispersion of the liquid crystal molecules may be controlled according to a ratio of the central group to the terminal group. In addition, the extraordinary refractive index ($n_e$) of the liquid crystal molecule and the ordinary refractive index ($n_o$) of the liquid crystal molecule may be controlled by selecting the terminal group, the linkage group, the central group, and the polar group (T-group) included in the liquid crystal molecule. In the present embodiment, the extraordinary refractive index ($n_e$) of the liquid crystal molecule included in the twisted liquid crystal layer 510 may be 1.57 to 1.59, and the ordinary refractive index ($n_o$) of the liquid crystal molecule included in the twisted liquid crystal layer 510 may be 1.47 to 1.49.

In the present embodiment, the tilting angle of the liquid crystal molecule may refer to an angle between the transmission axis of the polarizing layer 520 and the longitudinal direction (or the long side) of the liquid crystal molecule.

The twisted liquid crystal layer 510 may include the liquid crystal molecules, a photocurable monomer, a polymerization initiator, or the like. The twisted liquid crystal layer 510 may be formed by coating a composition including liquid crystal molecules, a photocurable monomer, a polymerization initiator, and a solvent on a base film and then tilting the liquid crystal molecules in a certain direction through ultraviolet irradiation and/or a rubbing process.

Table 1 below shows various samples having various ranges of the thickness of the twisted liquid crystal layer 510, the top tilting angle T, the bottom tilting angle B, and the angle Δθ that is difference between the top tilting angle T and the bottom tilting angle B among the polarizing films having an effective retardation value ($R_{\textit{eff}}$) of the twisted liquid crystal layer 510 in a range of about 124 nm to about 143 nm.

TABLE 1

| | Thickness of twisted liquid crystal layer (μm) | Center Tilting angle | Angle between top tilting angle (T) and bottom tilting angle (B) (Δθ) | Bottom tilting angle (B) | Top tilting angle (T) | Effective retardation value (nm) | $n_e$ | $n_o$ |
|---|---|---|---|---|---|---|---|---|
| #1 | 3.75 | 165.9 | 43.4 | 187.6 | 231 | 132.8 | 1.585 | 1.483 |
| #2 | 3.75 | 170 | 40 | 190 | 230 | 125.1 | 1.585 | 1.483 |
| #3 | 3.75 | 175 | 30 | 190 | 220 | 164.1 | 1.585 | 1.483 |
| #4 | 2.9 | 101.8 | 69.5 | 136.5 | 67 | 124.7 | 1.585 | 1.483 |
| #5 | 2.5 | 110 | 70 | 145 | 75 | 122.3 | 1.585 | 1.483 |
| #6 | 1.4 | 130 | 30 | 145 | 115 | 126.2 | 1.585 | 1.483 |
| #7 | 1.4 | 140 | 30 | 125 | 95 | 126.2 | 1.585 | 1.483 |
| #8 | 2.93 | 102.8 | 68.5 | 137 | 68.5 | 127.9 | 1.585 | 1.483 |
| #9 | 2.91 | 171.6 | 69.2 | 137 | 67.8 | 136.4 | 1.58 | 1.48 |
| #10 | 2.91 | 173.2 | 70.1 | 138.1 | 68 | 137.4 | 1.58 | 1.48 |
| #11 | 2.91 | 170.7 | 70.1 | 135.7 | 65.7 | 127 | 1.58 | 1.48 |
| #12 | 2.91 | 173.6 | 70.2 | 138.5 | 68.3 | 138.6 | 1.58 | 1.48 |
| #13 | 2.91 | 174 | 69.9 | 139 | 69.2 | 142.1 | 1.58 | 1.48 |
| #14 | 2.91 | 173.7 | 69.7 | 138.8 | 69.1 | 142 | 1.58 | 1.48 |
| #15 | 2.94 | 171.6 | 69.2 | 137 | 67.8 | 136.4 | 1.58 | 1.48 |
| #16 | 3.71 | 147.8 | 44.1 | 169.8 | 213.9 | 136.4 | 1.58 | 1.48 |
| #17 | 3.73 | 148.7 | 43.8 | 170.6 | 214.4 | 137.4 | 1.58 | 1.48 |
| #18 | 3.73 | 146.5 | 43.7 | 168.3 | 212 | 127 | 1.58 | 1.48 |
| #19 | 3.73 | 149.1 | 43.7 | 171 | 214.7 | 138.6 | 1.58 | 1.48 |
| #20 | 3.72 | 149.7 | 43.8 | 171.7 | 215.5 | 142.1 | 1.58 | 1.48 |
| #21 | 3.72 | 149.7 | 43.8 | 171.6 | 215.3 | 142 | 1.58 | 1.48 |
| #22 | 3.59 | 147.7 | 44.3 | 169.8 | 214.2 | 136.4 | 1.58 | 1.48 |

The inventors of the disclosure confirmed through experiments that samples #4 and #8 to #15 among the samples provided the optimal polarizing films. That is, it is confirmed that, even when the effective retardation value ($R_{eff}$) is in a range of about 124 nm to about 143 nm, the implementation of optimal front reflectance, side reflectance, and neutral black may be achieved within the effective ranges of the top tilting angle and the bottom tilting angle.

FIG. 5 illustrates front reflectance for some samples of Table 1, and FIG. 6 illustrates side reflectance in a lateral direction of 40° with respect to a front side. The reflectance of FIGS. 5 and 6 represents a Specular Component Included ("SCI") reflectance.

Referring to FIGS. 5 and 6, both the front reflectance and the side reflectance of samples #4 and #8 according to the disclosure were measured to be lower than the front reflectance and the side reflectance of sample #2. Referring to FIG. 6, samples #4 and #8 maintained low reflectance as a rotating angle (e.g., an azimuthal angle) φ based on a normal direction to the upper surface of the polarizing film changes, whereas a large variation in reflectance of sample #2 was measured as the angle φ changes.

As such, all the samples of Table 1 have an effective retardation value of about 124 nm to about 143 nm, but It may be confirmed that the reflectances thereof are different from each other according to the top tilting angle of the twisted liquid crystal layer, the bottom tilting angle of the twisted liquid crystal layer, and the thickness of the twisted liquid crystal layer.

FIG. 7 illustrates reflection chroma for some samples of Table 1 in International Commission on Illumination ("CIE") L*a*b* coordinates. In FIG. 7, when samples are located at a*=0 and b*=0 in the CIE L*a*b* color space coordinates, the reflection chroma means neutral black.

In the CIE L*a*b* coordinate system, as the distance from a*=0 and b*=0 increases, a red-based color may appear in a first quadrant, a green-based color may appear in a second quadrant, a blue-based color may appear in a third quadrant, and a purple-based color may appear in a fourth quadrant. Alternatively, when a* is negative, it may be understood as a color closer to green, when a* is positive, it may be understood as a color closer to red or purple, when b* is negative, it may be understood as blue, and when b* is positive, it may be understood as a color closer to yellow.

On the other hand, it may be understood that the expression "the distance from the coordinates of a*=0 and b*=0 increases" means that the chroma of the reflected light increases. In addition, the increase in the chroma of the reflected light means that the color is visually recognized. This may mean that black visibility is lowered.

Referring to FIG. 7, samples #4 and #8 are arranged closer to the coordinates of a*=0 and b*=0 than samples #2. This may mean that the reflection chroma is closer to neutral black.

Samples #4 and #8 correspond to the embodiment, and samples #4 and #8 satisfy the following conditions.

According to an embodiment, the top tilting angle is about 64° to about 75°, where the top tilting angle is an angle at which the liquid crystal molecules disposed in the uppermost portion of the twisted liquid crystal layer are inclined with respect to the transmission axis, the bottom tilting angle is about 135° to about 145°, where the bottom tilting angle is an angle at which liquid crystal molecules disposed in the lowermost portion of the twisted liquid crystal layer are inclined with respect to the transmission axis, and the thickness of the twisted liquid crystal layer satisfies a range of about 2.5 μm to about 3 μm.

FIG. 8 illustrates SCI reflectance and Specular Component Excluded (SCE) reflectance for some samples of Table 1. The SCI reflectance refers to reflectance including specular light, and the SCE reflectance refers to reflectance for diffuse light excluding specular light. FIGS. 9A to 9C illustrate reflection chroma for some samples of Table 1 in CIE L*a*b* coordinates. FIGS. 9A, 9B, and 9C illustrate reflection chroma at azimuthal angles of 0°, 45°, and 95°, respectively.

Referring to FIG. 8, it may be confirmed that the SCI reflectance and the SCE reflectance of samples #8 to #15 are lower than the reflectance of samples #2. Referring to FIGS.

9A to 9C, it may be confirmed that samples #9 to #15 are arranged at coordinates adjacent to a*=0 and b*=0 for various angles.

FIG. 10 shows data obtained by measuring lateral characteristics of some samples of Table 1.

Azimuthal angle color distribution (AACD), which is the lateral characteristics, may be obtained by the following equation.

$$AACD=\{Max(a^*)-Min(a^*)\}\times\{Max(b^*)-Min(b^*)\}$$

where a* and b* are coordinate values in a CIE L*a*b* coordinate system, Max(a*) and Min(a*) are a maximum value and a minimum value of a* coordinate values measured for an azimuthal angle φ=0° to 360°, respectively, and Max(b*) and Min(b*) are a maximum value and a minimum value of b* coordinate values measured for an azimuthal angle φ=0° to 360°, respectively.

The lateral characteristics are extracted from the values shown in the CIE L*a*b* coordinate system according to the azimuthal angle. As the value is lower, the side color change according to the azimuthal angle appears small.

Referring to FIG. 10, the AACD values of samples #8 to #15 at a polar angle of 40° are generally 20 or less, but the AACD value of sample #2 is as great as 50.45. Samples #8 to #15 at a polar angle of 40° show a small color change with respect to the azimuthal angles, and thus, an observer may have the same color sense no matter which direction the observer views.

As in sample #8 of Table 1, samples #9 to #15 satisfy the following conditions.

The top tilting angle is about 64° to about 75°, where the top tilting angle is an angle at which the liquid crystal molecules disposed in the uppermost portion of the twisted liquid crystal layer are inclined with respect to the transmission axis, the bottom tilting angle is about 135° to about 145°, where the bottom tilting angle is an angle at which liquid crystal molecules disposed in the lowermost portion of the twisted liquid crystal layer are inclined with respect to the transmission axis, and the thickness of the twisted liquid crystal layer satisfies a range of about 2.5 μm to about 3 μm.

FIG. 11 is a graph showing wavelength dispersion characteristics of sample #12 in Table 1.

The wavelength dispersion DSP of FIG. 11 represents a ratio of a retardation value of a polarizing film according to a wavelength (λ) with respect to a retardation value at a reference wavelength (e.g., 550 nm): R(λ)/R(550 nm). In this case, R(λ) refers to the retardation value at the wavelength (λ). Graph (a) shows wavelength dispersion in an ideal case. As a graph is closer to graph (a), the graph has an ideal wavelength dispersion value. Graph (b) shoes wavelength dispersion of sample #12 among the samples of Table 1. It is confirmed that graph (b) has wavelength dispersion characteristics similar to wavelength dispersion characteristics of graph (a).

The wavelength dispersion of the polarizing film according to the embodiment may satisfy the following relationship.

$$DSP(450\ nm)=R(450\ nm)/R(550\ nm)<1,$$

$$DSP(650\ nm)=R(650\ nm)/R(550\ nm)>1$$

Graph (c) shows wavelength dispersion of the polarizing film when the twisted liquid crystal layer is not applied. It is confirmed that graph (c) shows wavelength dispersion characteristics opposite to the wavelength dispersion characteristics of graph (a).

As described above, the polarizing film according to the present embodiment includes the twisted liquid crystal layer, and the twisted liquid crystal layer has a top tilting angle of about 64° to about 75°, a bottom tilting angle is about 135° to about 145°, and a thickness of about 2.5 μm to about 3 μm. Therefore, the polarizing film according to the present embodiment may minimize the front reflectance and the side reflectance and satisfy neutral black with uniform color sense.

The polarizing film according to one or more embodiments may be applied to a display apparatus.

FIG. 12 is a plan view schematically illustrating a display apparatus according to an embodiment. Here, the "plan view" is a view in the thickness direction.

A plurality of pixels PX each including a display element, such as an organic light-emitting diode, may be arranged in a display area DA of a substrate 100. The pixels PX may each further include a storage capacitor and a plurality of thin-film transistors configured to control the display element. The number of thin-film transistors included in one pixel may be variously modified. For example, one to seven thin-film transistors may be included in one pixel.

Various wirings configured to transmit electrical signals to be applied to the display area DA may be located in a peripheral area PA of the substrate 100. A thin-film transistor may also be provided in the peripheral area PA. In this case, the thin-film transistor arranged in the peripheral area PA may be a portion of a circuit configured to control an electrical signal to be applied to the display area DA.

Hereinafter, an organic light-emitting display will be described as an example of a display apparatus according to an embodiment, but the display apparatus according to the disclosure is not limited thereto. In another embodiment, various types of display apparatuses, such as an inorganic electroluminescence ("EL") display (or an inorganic light-emitting display) and a quantum dot light-emitting display, may be used.

FIG. 13 is a cross-sectional view schematically illustrating a portion of a display apparatus, according to an embodiment.

Referring to FIG. 13, the display apparatus includes a substrate 100, thin-film transistors T1 and T2 disposed on the substrate 100, and an organic light-emitting diode 300 electrically connected to the thin-film transistors T1 and T2. In addition, the display apparatus may further include various insulating layers and a storage capacitor Cst. The various insulating layers may include a buffer layer 111, a first gate insulating layer 112, a second gate insulating layer 113, an interlayer insulating layer 115, a planarization layer 118, and a pixel defining layer 119.

The substrate 100 may include various materials, such as a glass material, a metal material, or a plastic material. According to an embodiment, the substrate 100 may be a flexible substrate. For example, the substrate 100 may include a polymer resin, such as polyethersulfone ("PES"), polyacrylate ("PAR"), polyetherimide ("PEI"), polyethylene naphthalate ("PEN"), polyethylene terephthalate ("PET"), polyphenylene sulfide ("PPS"), polyarylate, polyimide ("PI"), polycarbonate ("PC"), or cellulose acetate propionate ("CAP").

The buffer layer 111 may be disposed on the substrate 100. The buffer layer 111 may reduce or prevent infiltration of foreign material, moisture, or ambient air from below the substrate 100, and may provide a flat surface on the substrate 100. The buffer layer 111 may include an inorganic material, such as an oxide or a nitride, an organic material, or an organic/inorganic composite material, and may have a single-layer or multilayer structure including an inorganic material and an organic material. A barrier layer (not illustrated) that prevents infiltration of ambient air may be further included between the substrate 100 and the buffer layer 111. In some embodiments, the buffer layer 111 may include silicon oxide ($SiO_2$) or silicon nitride ($SiN_x$).

The first thin-film transistor T1 and/or the second thin-film transistor T2 may be disposed on the buffer layer 111. The first thin-film transistor T1 includes a semiconductor layer A1, a gate electrode G1, a source electrode S1, and a drain electrode D1, and the second thin-film transistor T2 includes a semiconductor layer A2, a gate electrode G2, a source electrode S2, and a drain electrode D2. The first thin-film transistor T1 may act as a driving thin-film transistor connected to the organic light-emitting diode 300 and configured to drive the organic light-emitting diode 300. The second thin-film transistor T2 may be connected to a data line DL and may act as a switching thin-film transistor. Although two thin-film transistors are illustrated in FIG. 13, the disclosure is not limited thereto. The number of thin-film transistors may be variously modified. For example, one to seven thin-film transistors may be provided.

The semiconductor layers A1 and A2 may include amorphous silicon or polysilicon. In another embodiment, the semiconductor layers A1 and A2 may include an oxide of at least one selected from indium (In), gallium (Ga), stannum (Sn), zirconium (Zr), vanadium (V), hafnium (Hf), cadmium (Cd), germanium (Ge), chromium (Cr), titanium (Ti), and zinc (Zn). The semiconductor layers A1 and A2 may each include a channel region, and a source region and a drain region doped with impurities.

The gate electrodes G1 and G2 are disposed on the semiconductor layers A1 and A2, respectively, with the first gate insulating layer 112 therebetween. The gate electrodes G1 and G2 may include molybdenum (Mo), aluminum (Al), copper (Cu), titanium (Ti), or the like, and may include a single layer or layers. For example, the gate electrodes G1 and G2 may each be a single Mo layer.

The first gate insulating layer 112 may include silicon oxide ($SiO_2$), silicon nitride ($SiN_x$), silicon oxynitride (SiON), aluminum oxide ($Al_2O_3$), titanium oxide ($TiO_2$), tantalum oxide ($Ta_2O_5$), hafnium oxide ($HfO_2$), or zinc oxide ($ZnO_2$).

The second gate insulating layer 113 may be disposed to cover the gate electrodes G1 and G2. The second gate insulating layer 113 may include silicon oxide ($SiO_2$), silicon nitride ($SiN_x$), silicon oxynitride (SiON), aluminum oxide ($Al_2O_3$), titanium oxide ($TiO_2$), tantalum oxide ($Ta_2O_5$), hafnium oxide ($HfO_2$), or zinc oxide ($ZnO_2$).

A first storage electrode CE1 of the storage capacitor Cst may overlap the first thin-film transistor T1 in a plan view. For example, the gate electrode G1 of the first thin-film transistor T1 may act as the first storage electrode CE1 of the storage capacitor Cst. However, the disclosure is not limited thereto. The storage capacitor Cst may not overlap the first thin-film transistor T1 and may be spaced apart from the thin-film transistors T1 and T2 in a plan view.

A second storage electrode CE2 of the storage capacitor Cst overlaps the first storage electrode CE1 in a plan view with the second gate insulating layer 113 therebetween. In this case, the second gate insulating layer 113 may act as a dielectric layer of the storage capacitor Cst. The second storage electrode CE2 may include a conductive material including molybdenum (Mo), aluminum (Al), copper (Cu), titanium (Ti), or the like, and may include a single layer or layers including the conductive material described above.

For example, the second storage electrode CE2 may be a single Mo layer or a multilayer of Mo/Al/Mo.

The interlayer insulating layer 115 is disposed on the entire surface of the substrate 100 to cover the second storage electrode CE2. The interlayer insulating layer 115 may include silicon oxide ($SiO_2$), silicon nitride ($SiN_x$), silicon oxynitride (SiON), aluminum oxide ($Al_2O_3$), titanium oxide ($TiO_2$), tantalum oxide ($Ta_2O_5$), hafnium oxide ($HfO_2$), or zinc oxide ($ZnO_2$).

The source electrodes S1 and S2 and the drain electrodes D1 and D2 are disposed on the interlayer insulating layer 115. The source electrodes S1 and S2 and the drain electrodes D1 and D2 may include a conductive material including molybdenum (Mo), aluminum (Al), copper (Cu), titanium (Ti), or the like, and may include a single layer or layers including the conductive material described above. For example, the source electrode S1 and S2 and the drain electrodes D1 and D2 may have a multilayer structure of Ti/Al/Ti.

The planarization layer 118 may be disposed on the source electrodes S1 and S2 and the drain electrodes D1 and D2, and the organic light-emitting diode 300 may be disposed on the planarization layer 118. The organic light-emitting diode 300 includes a first electrode 310, an intermediate layer 320 including an organic emission layer, and a second electrode 330.

The planarization layer 118 may have a flat upper surface so that the first electrode 310 is formed to be flat. The planarization layer 118 may include a single layer or layers including an organic material or an inorganic material. The planarization layer 118 may include general-purpose polymer (e.g., benzocyclobutene (BCB), PI, hexamethyldisiloxane (HMDSO), polymethylmethacrylate (PMMA), or polystyrene (PS)), polymer derivatives having a phenolic group, acrylic polymer, imide-based polymer, aryl ether-based polymer, amide-based polymer, fluorine-based polymer, p-xylene-based polymer, vinyl alcohol-based polymer, and/or any blend thereof. On the other hand, the planarization layer 118 may include silicon oxide ($SiO_2$), silicon nitride ($SiN_x$), silicon oxynitride (SiON), aluminum oxide ($Al_2O_3$), titanium oxide ($TiO_2$), tantalum oxide ($Ta_2O_5$), hafnium oxide ($HfO_2$), or zinc oxide ($ZnO_2$). After the planarization layer 118 is formed, chemical mechanical polishing may be performed thereon so as to provide a flat upper surface.

The planarization layer 118 has an opening exposing one of the source electrode S1 and the drain electrode D1 of the first thin-film transistor T1. The first electrode 310 comes into contact with the source electrode S1 or the drain electrode D1 through the opening so as to be electrically connected to the first thin-film transistor T1.

The pixel defining layer 119 may be disposed on the first electrode 310. The pixel defining layer 119 defines a pixel by having an opening 119OP corresponding to each sub-pixel, that is, the opening 119OP through which at least a central portion of the first electrode 310 is exposed. In addition, the pixel defining layer 119 may prevent an electric arc or the like from occurring between the edge of the first electrode 310 and the second electrode 330 by increasing distances between the edge of the first electrode 310 and the second electrode 330. The pixel defining layer 119 may include, for example, an organic material, such as PI or HMDSO.

A spacer (not illustrated) may be disposed on the pixel defining layer 119. The spacer may be used to prevent damage of mask that may occur during a mask process required for forming the intermediate layer 320 of the organic light-emitting diode 300. The spacer may include an organic material, such as PI or HMDSO. The spacer may be formed simultaneously with the pixel defining layer 119 and may include the same material as the material of the pixel defining layer 119. In this case, a halftone mask may be used.

The intermediate layer 320 of the organic light-emitting diode 300 may include an organic emission layer. The organic emission layer may include an organic material including a fluorescent or phosphorescent material that emits red light, green light, blue light, or white light. The organic emission layer may include a low molecular weight organic material or a high molecular weight organic material. Optionally, functional layers, such as a hole transport layer ("HTL"), a hole injection layer ("HIL"), an electron transport layer ("ETL"), and an electron injection layer ("EIL"), may be further disposed below and above the organic emission layer. The intermediate layer 320 may be disposed to correspond to each of a plurality of first electrodes 310. However, the disclosure is not limited thereto. The intermediate layer 320 may be variously modified. For example, the intermediate layer 320 may include an integral layer over the first electrodes 310.

The second electrode 330 may be a transmissive electrode or a reflective electrode. In some embodiments, the second electrode 330 may be a transparent or semitransparent electrode, and may include a metal thin-film having a low work function and including Li, Ca, LiF/Ca, LiF/Al, Al, Ag, Mg, and/or any compound thereof. In addition, a transparent conductive oxide ("TCO") layer, such as ITO, IZO, ZnO, or $In_2O_3$, may be further disposed on the metal thin-film. The second electrode 330 may be disposed over the display area DA and the peripheral area PA, and may be disposed on the intermediate layer 320 and the pixel defining layer 119. The second electrode 330 may be formed integrally in a plurality of organic light-emitting diodes 300 to correspond to the first electrodes 310. A more specific configuration of the organic light-emitting diode 300 according to an embodiment will be described below.

A thin-film encapsulation layer 400 that encapsulates the display area DA may be further disposed on the organic light-emitting diode 300. The thin-film encapsulation layer 400 may cover the display area DA to protect the organic light-emitting diode 300 or the like from ambient moisture or oxygen. The thin-film encapsulation layer 400 may include a first inorganic encapsulation layer 410, an organic encapsulation layer 420, and a second inorganic encapsulation layer 430.

The first inorganic encapsulation layer 410 may cover the second electrode 330, and may include ceramic, metal oxide, metal nitride, metal carbide, metal oxynitride, indium oxide ($In_2O_3$), tin oxide ($SnO_2$), ITO, silicon oxide, silicon nitride, and/or silicon oxynitride. Other layers, such as a capping layer, may be disposed between the first inorganic encapsulation layer 410 and the second electrode 330. Because the first inorganic encapsulation layer 410 is formed along a structure therebelow, the upper surface of the first inorganic encapsulation layer 410 is not flat, as illustrated in FIG. 13.

The organic encapsulation layer 420 may cover the first inorganic encapsulation layer 410. Unlike the first inorganic encapsulation layer 410, the upper surface of the organic encapsulation layer 420 may be substantially flat. Specifically, the organic encapsulation layer 420 may have a substantially flat upper surface in a portion corresponding to the display area DA. The organic encapsulation layer 420 may include at least one material selected from acrylic, methacrylic, polyester, polyethylene, polypropylene, PET, PEN, PC, PI, polyethylene sulfonate, polyoxymethylene, polyarylate, and HMDSO.

The second inorganic encapsulation layer 430 may cover the organic encapsulation layer 420, and may include ceramic, metal oxide, metal nitride, metal carbide, metal oxynitride, indium oxide ($In_2O_3$), tin oxide ($SnO_2$), ITO, silicon oxide, silicon nitride, and/or silicon oxynitride. The second inorganic encapsulation layer 430 may come into contact with the first inorganic encapsulation layer 410 at an edge thereof located outside the display area DA, so that the organic encapsulation layer 420 is not exposed to the outside.

Because the thin-film encapsulation layer 400 includes the first inorganic encapsulation layer 410, the organic encapsulation layer 420, and the second inorganic encapsulation layer 430, the multilayer structure may prevent cracks from being connected to each other between the first inorganic encapsulation layer 410 and the organic encapsulation layer 420 or between the organic encapsulation layer 420 and the second inorganic encapsulation layer 430, even when cracks occur in the thin-film encapsulation layer 400. Therefore, it is possible to prevent or minimize formation of a path through which ambient moisture or oxygen penetrates into the display area DA.

On the other hand, in the present embodiment, the thin-film encapsulation layer 400 is used as an encapsulation member for encapsulating the organic light-emitting diode 300, but the disclosure is not limited thereto. For example, as the encapsulation member for encapsulating the organic light-emitting diode 300, an encapsulation substrate that is bonded to the substrate 100 by a sealant or frit may be used.

In the present embodiment, a polarizing film 500 for improving outdoor visibility is disposed on the thin-film encapsulation layer 400 or the sealing substrate. As illustrated in FIG. 1, the polarizing film 500 may include a polarizing layer 520 and a twisted liquid crystal layer 510. In this case, the twisted liquid crystal layer 510 of the polarizing film 500 may be disposed closer to the thin-film encapsulation layer 400 than the polarizing layer 520.

In the present embodiment, the top tilting angle may be about 64° to about 75°, where the top tilting angle is an angle at which the liquid crystal molecules disposed in the uppermost portion of the twisted liquid crystal layer 510 are inclined with respect to the transmission axis, the bottom tilting angle may be about 135° to about 145°, where the bottom tilting angle is an angle at which liquid crystal molecules disposed in the lowermost portion of the twisted liquid crystal layer are inclined with respect to the transmission axis, and the thickness of the twisted liquid crystal layer 510 may be about 2.5 μm to about 3 μm.

Various functional layers, such as a touch screen layer and a window, may be further disposed above the thin-film encapsulation layer 400, and a capping layer for improving light efficiency may be further between the second electrode 330 and the thin-film encapsulation layer 400.

Because the polarizing films according to the embodiments have low reflection chroma, visibility of display apparatuses employing the same may be improved.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A polarizing film comprising:
a polarizing layer; and
a twisted liquid crystal layer arranged on one side of the polarizing layer, and comprising liquid crystal molecules arranged to have different degrees of inclination from each other with respect to a transmission axis of the polarizing layer in a thickness direction,
wherein a top tilting angle is about 64 degrees (°) to about 75°, the top tilting angle is an angle at which the liquid crystal molecules arranged in an uppermost portion of the twisted liquid crystal layer are inclined with respect to the transmission axis of the polarizing layer,
a bottom tilting angle is about 135° to about 145°, the bottom tilting angle is an angle at which the liquid crystal molecules arranged in a lowermost portion of the twisted liquid crystal layer are inclined with respect to the transmission axis of the polarizing layer, and
the twisted liquid crystal layer has a thickness of about 2.5 micrometers (μm) to about 3 μm in the thickness direction.

2. The polarizing film of claim 1, wherein an angle between the top tilting angle and the bottom tilting angle is about 25° to about 75°.

3. The polarizing film of claim 1, wherein the twisted liquid crystal layer has a negative dispersion characteristic.

4. The polarizing film of claim 1, wherein the liquid crystal molecules included in the twisted liquid crystal layer have a positive dispersion characteristic.

5. The polarizing film of claim 1, wherein the liquid crystal molecules included in the twisted liquid crystal layer have a rod shape.

6. The polarizing film of claim 1, further comprising:
a first protective layer between the polarizing layer and the twisted liquid crystal layer; and
a second protective layer on the polarizing layer,
wherein the first protective layer and the second protective layer comprise at least one selected from triacetyl cellulose (TAC), cyclo olefin polymer, polymethyl methacrylate (PMMA), and polyethylene terephthalate (PET).

7. The polarizing film of claim 1, further comprising a retardation compensation layer under the twisted liquid crystal layer.

8. The polarizing film of claim 7, further comprising an adhesive layer under the retardation compensation layer.

9. The polarizing film of claim 1, wherein an effective retardation value of the twisted liquid crystal layer is about 124 nanometers (nm) to about 143 nm.

10. The polarizing film of claim 1, wherein an azimuthal angle color distribution (AACD) value when a polar angle of the polarizing film is 40° is 20 or less,
wherein AACD={Max(a*)−Min(a*)}×{Max(b*)−Min(b*)},
a* and b* are coordinate values in an International Commission on Illumination (CIE) L*a*b* coordinate system,
Max(a*) and Min(a*) are a maximum value and a minimum value of a* coordinate values measured for an azimuthal angle φ=0° to 360°, respectively, and
Max(b*) and Min(b*) are a maximum value and a minimum value of b* coordinate values measured for an azimuthal angle φ=0° to 360°, respectively.

11. A display apparatus comprising:
a substrate;
a plurality of display elements on the substrate;
an encapsulation member encapsulating the plurality of display elements; and
a polarizing film on the encapsulation member,
wherein the polarizing film comprises a polarizing layer and a twisted liquid crystal layer arranged on one side of the polarizing layer, the twisted liquid crystal layer comprising liquid crystal molecules arranged to have different degrees of inclination from each other with respect to a transmission axis of the polarizing layer in a thickness direction,
a top tilting angle is about 64° to about 75°, the top tilting angle is an angle at which the liquid crystal molecules arranged in an uppermost portion of the twisted liquid crystal layer are inclined with respect to the transmission axis of the polarizing layer,
a bottom tilting angle is about 135° to about 145°, the bottom tilting angle is an angle at which the liquid crystal molecules arranged in a lowermost portion of the twisted liquid crystal layer are inclined with respect to the transmission axis of the polarizing layer, and
the twisted liquid crystal layer has a thickness of about 2.5 μm to about 3 μm in the thickness direction.

12. The display apparatus of claim 11, wherein an angle between the top tilting angle and the bottom tilting angle is about 25° to about 75°.

13. The display apparatus of claim 11, wherein the twisted liquid crystal layer has a negative dispersion characteristic.

14. The display apparatus of claim 11, wherein the liquid crystal molecules included in the twisted liquid crystal layer have a positive dispersion characteristic.

15. The display apparatus of claim 11, wherein the liquid crystal molecules included in the twisted liquid crystal layer have a rod shape.

16. The display apparatus of claim 11, further comprising:
a first protective layer between the polarizing layer and the twisted liquid crystal layer; and
a second protective layer on the polarizing layer,
wherein the first protective layer and the second protective layer comprise at least one selected from triacetyl cellulose (TAC), cyclo olefin polymer, polymethyl methacrylate (PMMA), and polyethylene terephthalate (PET).

17. The display apparatus of claim 11, further comprising a retardation compensation layer under the twisted liquid crystal layer.

18. The display apparatus of claim 17, further comprising an adhesive layer under the retardation compensation layer.

19. The display apparatus of claim 11, wherein an effective retardation value of the twisted liquid crystal layer is about 124 nm to about 143 nm.

20. The display apparatus of claim 11, wherein an azimuthal angle color distribution (AACD) value when a polar angle of the polarizing film is 40° is 20 or less,
wherein AACD={Max(a*)−Min(a*)}×{Max(b*)−Min(b*)},
a* and b* are coordinate values in a CIE L*a*b* coordinate system,
Max(a*) and Min(a*) are a maximum value and a minimum value of a* coordinate values measured for an azimuthal angle φ=0° to 360°, respectively, and
Max(b*) and Min(b*) are a maximum value and a minimum value of b* coordinate values measured for an azimuthal angle φ=0° to 360°, respectively.

* * * * *